United States Patent
Park et al.

(10) Patent No.: US 10,498,988 B2
(45) Date of Patent: Dec. 3, 2019

(54) IMAGE PROCESSING DEVICE AND METHOD

(71) Applicant: Hanwha Techwin Co., Ltd., Seongnam-si (KR)

(72) Inventors: Jong Seon Park, Changwon-si (KR); Jung Won Pac, Changwon-si (KR); Joo Hyun Yoon, Changwon-si (KR); Seung Wook Nam, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 58 days.

(21) Appl. No.: 15/860,587

(22) Filed: Jan. 2, 2018

(65) Prior Publication Data

US 2018/0255256 A1    Sep. 6, 2018

(30) Foreign Application Priority Data

Mar. 6, 2017    (KR) .................. 10-2017-0028547

(51) Int. Cl.
| | |
|---|---|
| *H04N 5/361* | (2011.01) |
| *H04N 5/243* | (2006.01) |
| *H04N 5/16* | (2006.01) |
| *H04N 5/232* | (2006.01) |
| *H04N 1/60* | (2006.01) |
| *H04N 5/33* | (2006.01) |
| *H04N 1/40* | (2006.01) |

(Continued)

(52) U.S. Cl.
CPC ............ *H04N 5/361* (2013.01); *G06T 5/002* (2013.01); *G06T 5/50* (2013.01); *H04N 1/40012* (2013.01); *H04N 1/6005* (2013.01); *H04N 1/6086* (2013.01); *H04N 5/16* (2013.01); *H04N 5/23245* (2013.01); *H04N 5/243* (2013.01); *H04N 5/332* (2013.01); *H04N 9/045* (2013.01); *H04N 9/64* (2013.01); *G06T 2207/10024* (2013.01); *G06T 2207/10152* (2013.01)

(58) Field of Classification Search
CPC ...... H04N 5/361; H04N 5/16; H04N 5/23245; H04N 5/332; H04N 5/243; H04N 9/045; H04N 9/64; H04N 1/40012; H04N 1/6005; H04N 1/6086; G06T 5/002; G06T 5/50
USPC ............................................ 348/223.1, 224.1
See application file for complete search history.

(56) References Cited

U.S. PATENT DOCUMENTS

| | | |
|---|---|---|
| 8,345,972 B2 | 1/2013 | Yi |
| 8,411,943 B2 | 4/2013 | Ovsiannikov et al. |

(Continued)

FOREIGN PATENT DOCUMENTS

JP    4418271    2/2010

OTHER PUBLICATIONS

Fuji Film, "Film Simulation, Revolution by Continuous Evolution", Mar. 24, 2016, available at: http://fujifilm-x.com/de/x-stories/film-simulation-revolution-by-continuous-evolution/. (Accessed on Dec. 18, 2017).

(Continued)

*Primary Examiner* — Sinh Tran
*Assistant Examiner* — Zhenzhen Wu
(74) *Attorney, Agent, or Firm* — H.C. Park & Associates, PLC

(57) ABSTRACT

Image processing devices and methods thereof use different color conversion data of an image obtained in a black-and-white mode under a low illuminance condition than that of an image obtained in a color mode.

14 Claims, 11 Drawing Sheets

(51) Int. Cl.
  *H04N 9/64* (2006.01)
  *G06T 5/50* (2006.01)
  *G06T 5/00* (2006.01)
  *H04N 9/04* (2006.01)

(56) References Cited

U.S. PATENT DOCUMENTS

| | | | | | |
|---|---|---|---|---|---|
| 2007/0195181 | A1* | 8/2007 | Onomura | ........... | H04N 5/23245 348/272 |
| 2010/0289885 | A1* | 11/2010 | Lu | ........... | H04N 5/2258 348/61 |
| 2011/0254974 | A1* | 10/2011 | Daisuke | ........... | H04N 9/735 348/223.1 |
| 2013/0155274 | A1* | 6/2013 | Yoshino | ........... | H04N 9/735 348/223.1 |
| 2013/0308009 | A1* | 11/2013 | Yoshida | ........... | H04N 5/243 348/223.1 |
| 2014/0104432 | A1* | 4/2014 | Lee | ........... | H04N 5/272 348/159 |

OTHER PUBLICATIONS

Gary Honis, "Infrared Imaging with Modified Canon Digital Rebel", Mar. 24, 2016, available at: http://dslrmodifications.com/rebelmod450d14a.html. (Accessed on Sep. 19, 2017).

Surpedia Technologies Co., Ltd., "What is an infrared cut filter?", Mar. 24, 2016, available at: http://www.surpedia.com/qa_detail.asp?cat=4. (Accessed on Sep. 19, 2017).

UNIFORE, "IP Camera Structure", Jan. 4, 2016, available at: https://www.unifore.net/ip-video-surveillance/ip-cameras-digital-watermark-media-security-technologies.html (Accessed on Dec. 21, 2017).

* cited by examiner

IMAGE PROCESSING DEVICE AND METHOD

CROSS-REFERENCE TO RELATED APPLICATION

This application claims priority from and the benefit of Korean Patent Application No. 10-2017-0028547, filed on Mar. 6, 2017, which is hereby incorporated by reference for all purposes as if fully set forth herein.

BACKGROUND

Field

The invention relates to generally to image processing devices and methods, and more particularly, to an image processing device and method capable of improving recognition of images obtained under a low illuminance condition, such as nighttime.

Discussion of the Background

A photographing mode of a surveillance camera may be changed according to the ambient illuminance. According to the related art, identical conversion data is used to adjust colors with respect to both an image obtained in a day photographing mode and an image obtained in a night photographing mode. In addition, the recognition of images obtained under a low illuminance condition (e.g., in a night photographing mode) is improved when using a black-and-white image in the night photographing mode instead of a color image. However, when the black-and-white image is generated by using a color image sensor, color balancing is performed by using identical conversion data as that of the color image.

The above information disclosed in this Background section is only for enhancement of understanding of the background of the inventive concepts, and, therefore, it may contain information that does not constitute prior art.

SUMMARY

Applicants recognized that black noise may be generated in the black-and-white image created when generating the image from a color image sensor. Image processing methods and image processing devices constructed according to the principles of the invention are capable of reducing black noise that occurs when a black-and-white mode is used to improve the clarity and/or recognition of an image obtained under a low illuminance condition.

Additional aspects will be set forth in part in the description which follows and, in part, will be apparent from the description, or may be learned by practice of the presented exemplary embodiments.

According to one aspect of the invention, an image processing device includes: an image obtaining unit configured to obtain a first image under a condition where an illuminance is substantially equal to or greater than a critical value, and to obtain a second image under a condition where the illuminance is less than the critical value; a mode converter configured to convert an image processing mode into a first mode, in which color signal processing is performed on the first image, and a second mode, in which black-and-white signal processing is performed on the second image; a color converter configured to convert a color of the first image by applying first color conversion data to the first image, and to convert a color of the second image by applying second color conversion data that is different from the first color conversion data to the second image; and an image converter configured to convert the color of the second image into a third image, in which color information of the second image is converted into brightness information.

According to another aspect of the invention, an method of processing images includes the steps of: selecting an image processing mode from a first mode, in which color signal processing is performed on a first image obtained under a condition where illuminance is substantially equal to or greater than a critical value, and a second mode, in which black-and-white signal processing is performed on a second image obtained under a condition where the illuminance is less than the critical value; if the first mode is selected, converting a color of the first image by applying first color conversion data to the first image; if the second mode is selected, converting a color of the second image by applying second color conversion data that is different from the first color conversion data to the second image; and converting the color of the second image into a third image, including converting the color information of the second image into brightness information.

The first color conversion data and the second color conversion data may include first conversion data and second conversion data, respectively.

At least one of the first conversion data and the second conversion data of the second color conversion data may be different from the other of the first conversion data and the second conversion data of the first color conversion data.

The first conversion data may be a gain and the second conversion data may be a color conversion matrix.

A gain of the second color conversion data may be substantially equal to a gain of the first color conversion data, and a color conversion matrix of the second color conversion data may be an identity matrix.

A gain of the second color conversion data may be substantially equal to a gain of the first color conversion data, and a color conversion matrix of the second color conversion data may be a combination of a color conversion matrix of the first color conversion data and an identity matrix.

In the color conversion matrix of the second color conversion data, a ratio of the identity matrix may increase as the illuminance becomes lower than the critical value.

The first conversion data of the second color conversion data may be an adjusted gain of the second color conversion data, and the adjusted gain may be adjusted based on light source information. The adjusted gain may be a combination of the gain of the first color conversion data and the gain of the second color conversion data.

The color conversion matrix of the second color conversion data may be an identity matrix or a combination of the color conversion matrix of the first color conversion data and an identity matrix.

The first image may include visible ray band information, and the second image may include the visible ray band information and an infrared ray (IR) band information.

A computer-readable recording medium may have embodied thereon and image processing method according to the principles and one or more exemplary embodiments of the invention.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE ILLUSTRATED EMBODIMENTS

Figure 1:
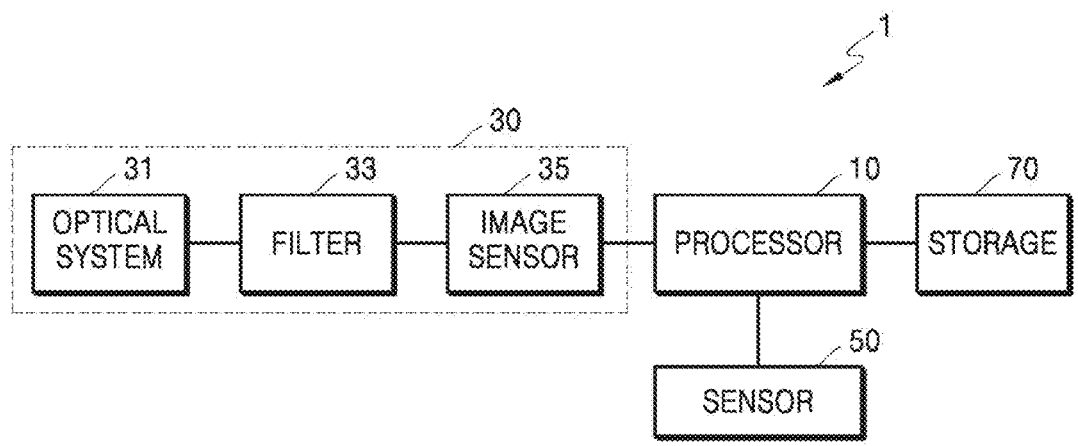
FIG. 1 is a schematic block diagram of an exemplary embodiment of an image processing device according to the principles of the invention.

Content provided hereinafter just illustrates the principles of the disclosure. Therefore, one of ordinary skill in the art may embody the principles of the disclosure, although not shown or described explicitly herein, and invent a variety of devices included in the spirit and scope of the disclosure. In addition, all of the conditional terms and embodiments listed herein are, in principle, intended to make the concept of the disclosure understood, and not limited to the particular embodiments and conditions listed herein. In addition, all the detailed descriptions listing particular embodiments, as well as the principles of the disclosure, aspects and embodiments, are to be understood to intend to include structural and functional equivalents of such information. Also, it is understood that such equivalents include equivalents to be developed in the future, that is, all devices invented to perform the same function, as well as equivalents that are currently known.

Thus, functions of various elements shown in the drawings, including functional blocks labeled as a processor or a similar concept may be provided through use of hardware that has capability of executing software in association with appropriate software, as well as dedicated hardware. When provided by a processor, functions may be provided by a single dedicated processor, single shared processor, or a plurality of individual processors, some of which may be shared. Furthermore, a processor, control, or a term suggested as a similar concept thereof, although it is clearly used, should not be construed as exclusively citing hardware having the ability to execute software, but should be construed as implicitly including Digital Signal Processor (DSP) hardware, or ROM, RAM, or non-volatile memory for storing software without restriction. The processor, control, or term may also include known other hardware.

The above objects, characteristics, and merits will become more apparent from the following detailed description taken in conjunction with the accompanying drawings. In the description, certain detailed explanations of the related art are omitted when it is deemed that they may unnecessarily obscure the essence of the disclosure.

Throughout the specification, when a portion "includes" an element, another element may be further included, rather than excluding the existence of the other element, unless otherwise described. As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described in detail with reference to accompanying drawings.

Figure 2:
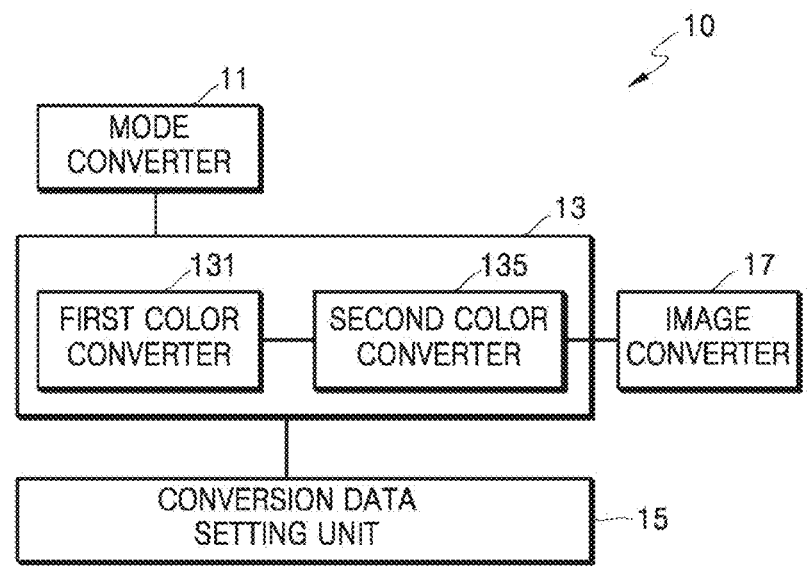
FIG. 2 is a schematic block diagram of a processor of FIG. 1.

FIG. 1 is a schematic block diagram of an exemplary embodiment of an image processing device 1 according to the principle of the invention. FIG. 2 is a schematic block diagram of a processor of FIG. 1.

Referring to FIG. 1, the image processing device 1 may be a monitoring camera or other surveillance device capable of capturing images such as a visual camera, a thermal camera, a special purpose camera, etc., a portable camera, a camcorder, etc. The image processing device 1 may be installed in an office, a house, a hospital, inside or outside a public building required to be monitored, e.g., a bank, etc., or outdoor such as a park, etc., and may have various shapes such as a straight type, a dome type, etc., according to an installation space and a purpose of usage.

The image processing device 1 may include a processor 10, an image obtaining unit 30, a sensor 50, and a storage device 70.

The image obtaining unit 30 may include an optical system 31, a filter 33, and an image sensor 35.

The optical system 31 may include a zoom lens, a focusing lens, an iris for adjusting light intensity, etc.

The image sensor 35 may convert light that passes through the optical system 31 into an electric image signal. The image sensor 35 may be a photoelectric conversion device such as a charge coupled device (CCD), a complementary metal oxide semiconductor (CMOS), etc.

The filter 33 may include a day filter and a night filter. The day filter may be an infrared ray (IR) cut filter (IRCF) that may transmit only light in a visible ray band recognizable by the human eye. The night filter may be a dummy glass that may transmit light in all wavelength bands. The day filter may be used in a day photographing mode in which ambient illuminance is substantially equal to or greater than a critical value, and the night filter may be used in a night photographing mode in which the ambient illuminance is smaller than the critical value.

Figure 3A:
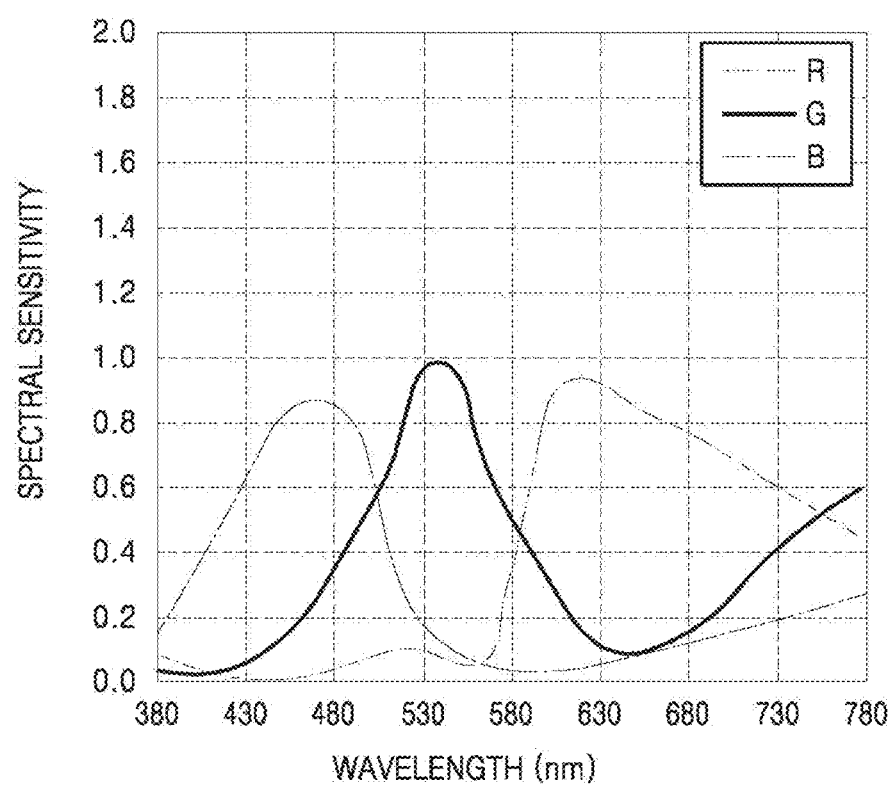
FIG. 3A is a graph showing a wavelength range of light recognizable by the human eye.
Figure 3B:
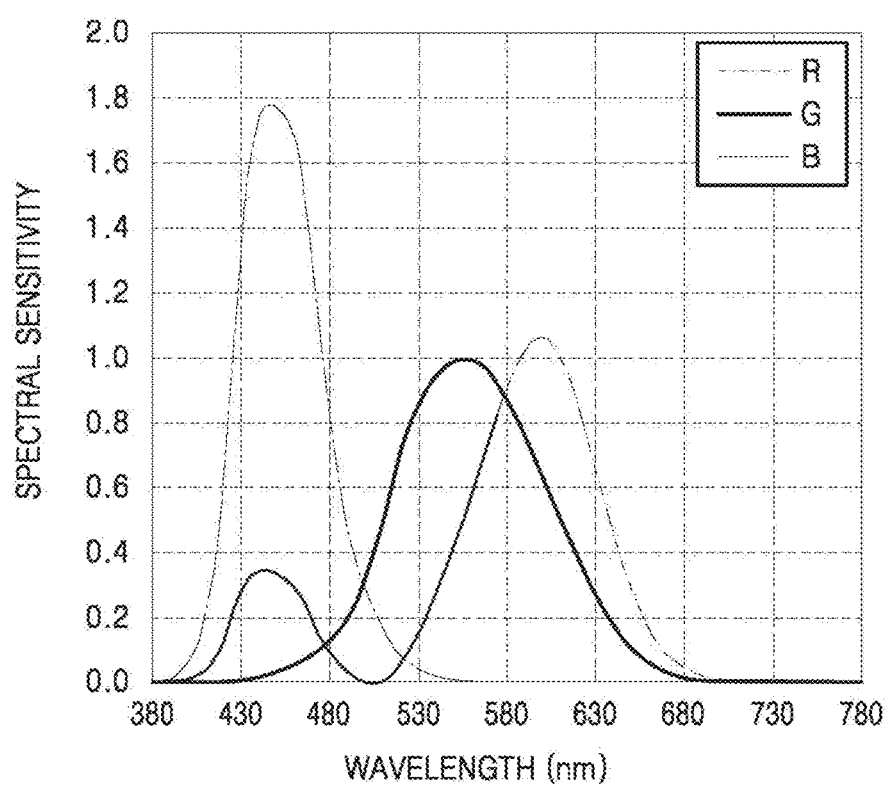
FIG. 3B is a graph showing a wavelength range of light recognizable by an image sensor.

Referring to FIGS. 3A and 3B, in general, light in a wavelength band recognizable by the human eye (FIG. 3A) is different from light in a wavelength band of the light recognizable by the image sensor (FIG. 3B). The X-axis of FIGS. 3A and 3B shows wavelength of the light (unit: nm) and Y-axis of FIGS. 3A and 3B shows spectral sensitivity. The light incident to the image sensor may include light in an ultraviolet (UV) ray band and light in a near infrared ray (NIR) band, in addition to light in the visible ray band. However, the light in the UV and NIR band may be in other bands than the wavelength band recognizable by a human visual system (HVS). Therefore, a filter that may block light in a wavelength band except for light in a visible ray band is necessary in order to obtain an image suitable for the HVS. An IRCF is a filter for blocking light in a wavelength band from being input to the camera in order to match the HVS and the input wavelength of the image sensor. The IRCF is a low pass filter that is used to obtain information that is most similar to the HVS by restricting the characteristic of the image sensor.

Figure 4A:
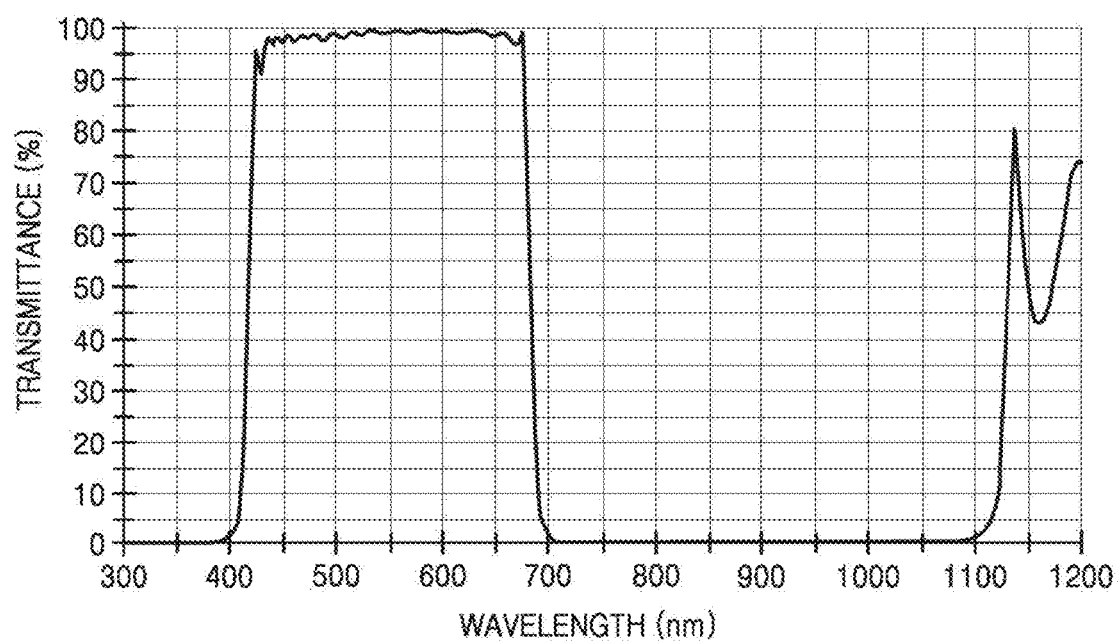
FIG. 4A is a graph showing the percentage of transmittance of infrared ray (IR) and/or ultraviolet (UV) radiation through a filter according to wavelength.
Figure 4B:
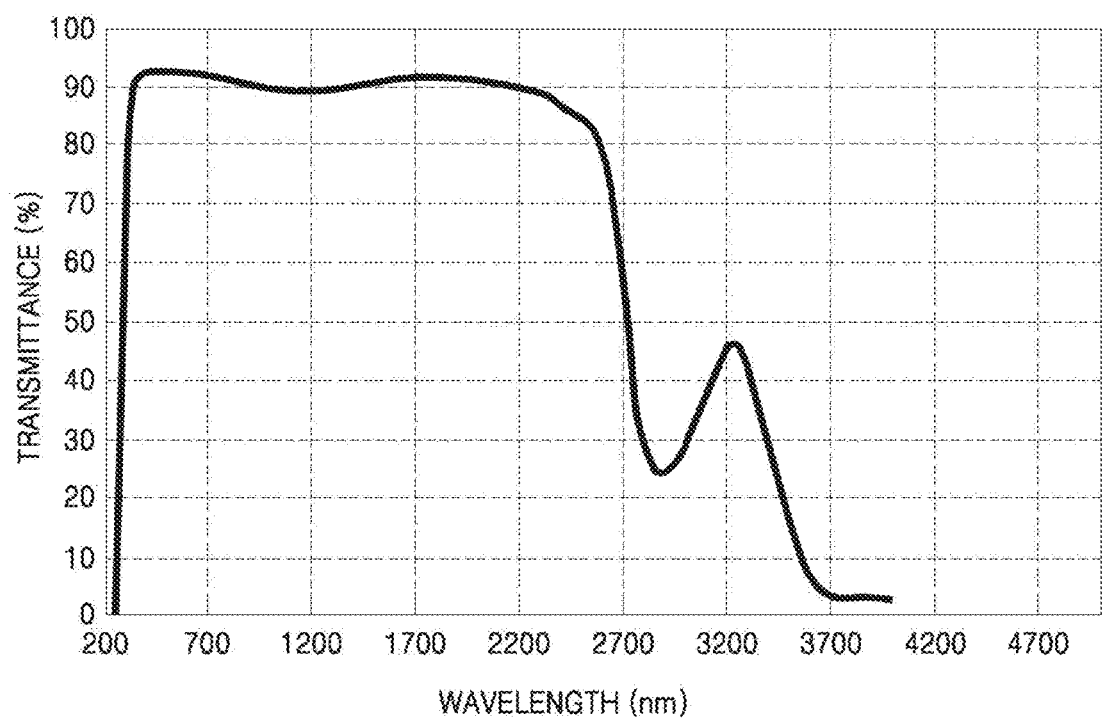
FIG. 4B is a graph showing the percentage of transmittance of radiation through a dummy glass according to wavelength.

FIG. 4A is a graph showing the percentage of transmittance of IR and/or UV radiation through a filter according to wavelength; and FIG. 4B is a graph showing the percentage of transmittance of radiation through a dummy glass according to wavelengths.

Referring to FIGS. 4A and 4B, the dummy glass can improve sensitivity of the image sensor by obtaining information of the NIR and UV lights that have been restricted by the IRCF, and thereby an SNR (signal to noise ratio) also can be improved. In particular, information that may be difficult to be obtained from the visible ray band under a low illuminance condition having less light intensity or at night may be acquired.

The sensor 50 (FIG. 1) may include a plurality of heterogeneous sensors obtaining different sensing information. For example, the sensor 50 may include an illuminance sensor that senses an illuminance of a photographing area and a variation in the illuminance. The illuminance sensor may output a sensing signal of the ambient illuminance.

The storage device 70 may store a program for processing and controlling the processor 10, and may temporarily store input or output data (e.g., images, etc.) The storage device 70 may include a storage medium having at least one type of a flash memory type, a hard disk type, a multimedia card micro type, a card type memory (e.g., an SD or XD memory, etc.), a random access memory (RAM), and a read only memory (ROM). Also, the storage device 70 may be a web storage performing a storage function on the Internet.

The processor 10 may be implemented as various numbers of hardware or/and software configurations performing certain functions. For example, the processor 10 may adopt direct circuit configurations such as a memory, processing, logic, look-up table, etc. that may perform various functions according to control of one or more microprocessors or other control devices. Examples of the processor 10 may include a microprocessor, a central processing unit (CPU), a processor core, a multi-processor, an application-specific integrated circuit (ASIC), a field programmable gate array (FPGA), etc., but the exemplary embodiments are not limited thereto. Functions of the processor 10 may be implemented in programming or scripting language by including various algorithms implemented as combinations of data structures, processes, routines, or other programming configurations.

The processor 10 may perform functions of a controller and an image processor.

The processor 10 controls overall operations of the image processing device 1, and for controlling operations of each of the elements such as the image obtaining unit 30, the sensor 50, the storage device 70, etc., the processor 10 exchanges signals with the elements or processes the data. For example, the controller may control switching operation of the filter according to the photographing mode.

The processor 10 may perform signal processing for improving image quality, such as noise reduction, gamma correction, color balancing, edge enhancement, etc. on a digital image signal from the image sensor 35 or a digital image signal converted from an analog image signal from the image sensor 35. The processor 10 may output color images in the day photographing mode, and black-and-white images in the night photographing mode.

FIG. 2 is a schematic block diagram of a processor of FIG. 1. Referring to FIG. 2, the processor 10 may include a mode converter 11, a color converter 13, a conversion data setting unit 15, and an image converter 17.

The mode converter 11 may determine and convert an image processing mode. The image processing mode may include a color mode, in which a color image is output by performing a color signal processing operation on an image input in the day photographing mode, and a black-and-white mode, in which a black-and-white image is output by performing a black-and-white processing operation on an image input in the night photographing mode.

The mode converter 11 may output a control signal for converting the image processing mode into the color mode in the day photographing mode, in which the ambient illuminance is substantially equal to or greater than the critical value, and may output a control signal for converting the image processing mode into the black-and-white mode in the night photographing mode, in which the ambient illuminance is smaller than the critical value. The critical value may be set by the user. In another embodiment, the mode converter 11 may output a control signal for converting the image processing mode to the color mode or the black-and-white mode according to a mode conversion request of the user. Since the dummy glass is used in the night photographing mode, the light of all wavelength bands may be transmitted and the recognition ratio of the image sensor may be improved. However, it is difficult to represent the image in colors that the human eyes may recognize, and thus, the black-and-white image from which color information is removed is used.

The color converter 13 may convert colors of an input image according to the image photographing mode or the image processing mode. Each of pixels in the input image may have at least one color component. For example, each pixel of the input image may have three color components, e.g., RGB.

The color converter 13 may convert colors of the input image by using color conversion data that varies depending on the image processing mode. The color converter 13 may convert the color of the input image by using first color conversion data in the color mode, and may convert the color of the input image by using second color conversion data in the black-and-white mode.

When the black-and-white image is generated by using a black-and-white image sensor, signal processing may be performed without performing an additional color balancing process. However, in the case where the black-and-white image is generated by using a color image sensor, a color balancing process is performed by using conversion data that is the same as that of the color image, and then, the image is converted to the black-and-white image, and in this case, black noise may generate in the black-and-white image. Therefore, according to the principles and exemplary embodiments of the invention, the conversion data used in the color balancing processes in the color mode and the black-and-white mode may be different from each other.

The color converter 13 may include a first color converter 131 and a second color converter 135.

The conversion data setting unit 15 may determine color conversion data that is optimal to the input image according to the image processing mode. The color conversion data may include first conversion data used by the first color converter 131 and second conversion data used by the second color converter 135.

The conversion data setting unit 15 may set the first conversion data of the color mode or first conversion data of the black-and-white mode that will be applied to the input image by using reference data.

In one exemplary embodiment, the conversion data setting unit 15 may set the first conversion data based on input RGB value of each pixel. In this case, the first conversion data may vary depending on each pixel.

In another exemplary embodiment, the conversion data setting unit 15 may determine the first conversion data based on an average of input RGB values of some pixels in the input image or an average of input RGB values of blocks obtained by splitting the input image. In this case, the first conversion data may be determined to be substantially equal with respect to all pixels included in the input image.

The first conversion data may be a gain. For example, the first conversion data with respect to each of RGB values may be respectively an R gain, a G gain, and a B gain. The reference data may be a lookup table of the first conversion data corresponding to the RGB values.

The first color converter 131 may perform a primary color conversion by applying the first conversion data of the corresponding image processing mode to the input image. The first color converter 131 may convert the input RGB values into first color conversion values R', G', and B' by multiplying the input RGB values by the RGB gains (Rgain, Ggain, and Bgain) in a pixel unit, as expressed by following equation (1). Every pixel in the input image may have different RGB gains from the others, or may have the RGB gains substantially equal to those of the other pixels in the input image.

$$R'=R\times R\text{gain}$$

$$G'=G\times G\text{gain}$$

$$B'=B\times B\text{gain} \quad (1)$$

The conversion data setting unit 15 may set second conversion data of the color mode or second conversion data of the black-and-white mode that will be applied to the input image by using the reference data.

In one exemplary embodiment, the conversion data setting unit 15 may determine the second conversion data based on the input RGB values of each pixel. In this case, the second conversion data may vary depending on each pixel.

In another exemplary embodiment, the conversion data setting unit 15 may determine the second conversion data based on an average of input RGB values of some pixels in the input image or an average of input RGB values of blocks obtained by splitting the input image. In this case, the second conversion data may be determined to be substantially equal with respect to all pixels included in the input image.

The second conversion data may be n×n color conversion matrix M. Here, n may denote the number of color components. The reference data may be a lookup table of the second conversion data corresponding to the RGB values.

The second color converter 135 may perform secondary color conversion by applying the second conversion data to the input image that has been primarily color-converted. The second color converter 135 may convert the first color conversion values R', G', and B' into second color conversion values R", G", and B" by multiplying the first color conversion values R', G', and B' by a 3×3 color conversion matrix in a pixel unit as expressed by following equation (2). Every pixel in the input image may have a different color conversion matrix from the others, or may have substantially the same color conversion matrix as those of the other pixels in the input image.

$$\begin{bmatrix} R'' \\ G'' \\ B'' \end{bmatrix} = M \times \begin{bmatrix} R' \\ G' \\ B' \end{bmatrix} \quad (2)$$

$$M = \begin{bmatrix} a11 & a12 & a13 \\ a21 & a22 & a23 \\ a31 & a32 & a33 \end{bmatrix}$$

The image converter 17 may convert the color information of the input image that is primarily and secondarily color-converted into brightness information in the black-and-white mode, to generate a black-and-white image only having the brightness information. Conversion of the color image into the black-and-white image is not particularly limited to a specific method, and various well-known methods such as a linear conversion, a non-linear conversion, etc. may be used.

In the above-described exemplary embodiment, the conversion data setting unit 15 and the color converter 13 are separately described, but the exemplary embodiments are not limited thereto, that is, the color converter 13 may integrally perform the conversion data setting function. For example, the first color converter 131 may perform the setting of the first conversion data and the primary color conversion, and the second color converter 135 may perform the setting of the second conversion data and the secondary color conversion.

Figure 5:
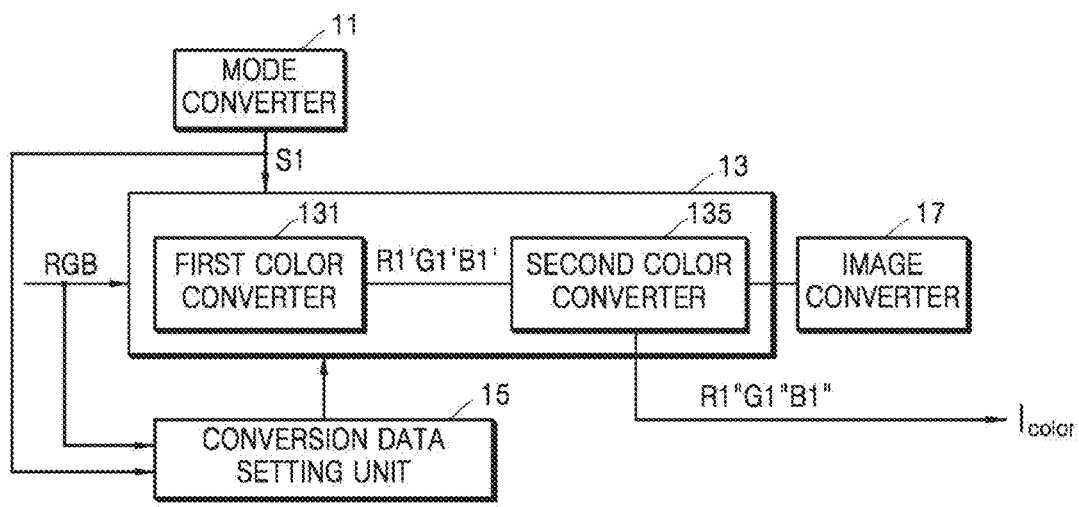
FIG. 5 is a diagram illustrating an exemplary color mode operation of a processor constructed according to an exemplary embodiment of the invention.

FIG. 5 is a diagram illustrating an exemplary color mode operation of a processor according to an exemplary embodiment of the invention.

The mode converter 11 may output a first control signal S1 for converting to the color mode, when the ambient illuminance is substantially equal to or greater than the critical value. The color converter 13 and the conversion data setting unit 15 may perform the color signal processing operation according to the color mode, based on the first control signal S1.

The conversion data setting unit 15 may set the first conversion data that will be applied to the input image obtained in the color mode by using the reference data, that is, the RGB gains in the color mode (hereinafter, referred to as 'first RGB gain'). Every pixel in the input image may have a first RGB gain different from the others, or may have the first RGB gain substantially equal to those of the other pixels in the input image.

The first color converter 131 may convert the input RGB values (R, G, and B) into first color conversion values (R1', G1', and B1') by multiplying the input RGB values (R, G, and B) by the first RGB gains (R1gain, G1gain, and B1gain) in a pixel unit, as expressed by following equation (3).

$$R1'=R\times R1\text{gain}$$

$$G1'=G\times G1\text{gain}$$

$$B1'=B\times B1\text{gain} \quad (3)$$

The conversion data setting unit 15 may set the second conversion data that will be applied to the input image obtained in the color mode by using the reference data, that is, a color conversion matrix (hereinafter, referred to as 'first color conversion matrix') of the color mode. Each component in the first color conversion matrix Mc may be determined based on an average of the input RGB values of the pixels or the input RGB values of some of the pixels in the input image, or an average of the input RGB values of blocks obtained by splitting the input image. Every pixel in the input image may have different first color conversion matrix Mc from the others, or may have the first color conversion matrix Mc substantially equal to those of the other pixels in the input image.

The second color converter 135 may convert the first color conversion values R1', G1', and B1' into second color conversion values R1", G1", and B1" by multiplying the first color conversion values R1', G1', and B1' by the first color conversion matrix Mc in a pixel unit as expressed by following equation (4). Accordingly, the second color converter 135 may output a color image Icolor obtained by converting the input RGB values into the second color conversion value.

$$\begin{bmatrix} R1'' \\ G1'' \\ B1'' \end{bmatrix} = Mc \times \begin{bmatrix} R1' \\ G1' \\ B1' \end{bmatrix} \quad (4)$$

$$Mc = \begin{bmatrix} RR & RG & RB \\ GR & GG & GB \\ BR & BG & BB \end{bmatrix}$$

Figure 6:
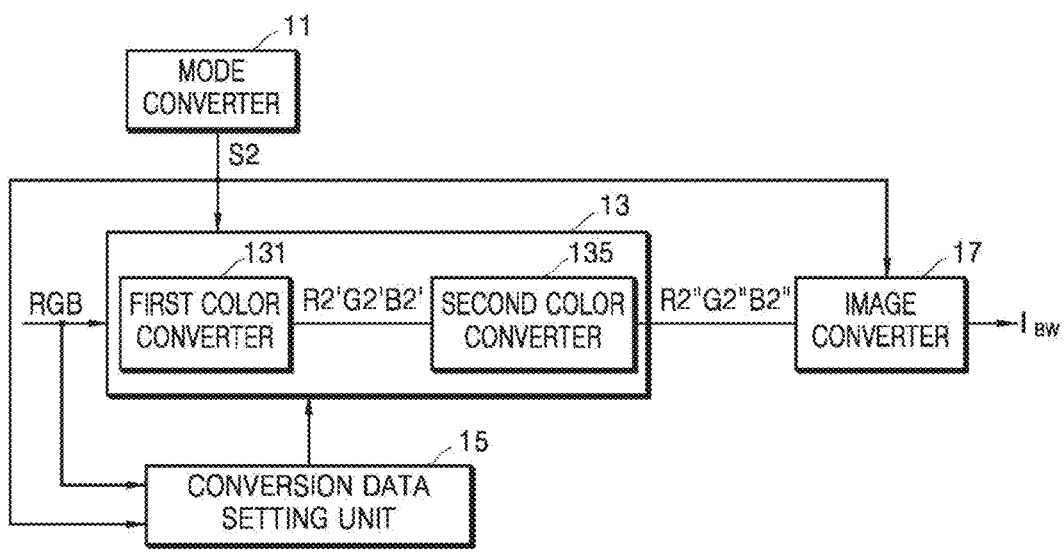
FIG. 6 is a diagram illustrating an exemplary black-and-white mode operation of the processor according to an exemplary embodiment of the invention.

FIG. 6 is a diagram illustrating an exemplary black-and-white mode operation of the processor according to an exemplary embodiment of the invention.

The mode converter 11 may output a second control signal S2 for converting to the black-and-white mode, when the ambient illuminance is lower than the critical value. The color converter 13, the conversion data setting unit 15, and the image converter 17 may perform black-and-white signal processing operations according to the black-and-white mode based on the second control signal S2.

The conversion data setting unit 15 may set the first conversion data that will be applied to the input image obtained in the black-and-white mode by using the reference data, that is, the RGB gains in the black-and-white mode (hereinafter, referred to as 'second RGB gain').

In one exemplary embodiment, the second RGB gain may be substantially equal to the first RGB gain.

Each pixel of the input image may have a second RGB gain different from those of the others. For example, the second RGB gain may be one of the first RGB gains of a corresponding pixel used in the color mode before being converted to the black-and-white mode. As an example, the second RGB gain may be the last first RGB gain of the corresponding pixel used in the color mode before being converted to the black-and-white mode. Otherwise, the second RGB gain may be one of an average value, a minimum value, and a maximum value of the first RGB gains of the corresponding pixel used for predetermined frames in the color mode before being converted to the black-and-white mode.

All of the pixels of the input image may have the same second RGB gains as those of one another. For example, the second RGB gain may be one of the first RGB gains used in the color mode before being converted to the black-and-white mode. As an example, the second RGB gain may be the first RGB gain of the last image obtained in the color mode before being converted to the black-and-white mode. Otherwise, the second RGB gain may be one of an average value, a minimum value, and a maximum value of the first RGB gains of the images during predetermined frames in the color mode before being converted to the black-and-white mode.

In another exemplary embodiment, the second RGB gain may be 1:1 RGB gain. The 1:1 RGB gain is a gain representing that the input RGB values (R, G, and B) do not change or variation thereof is restricted to the minimum. For example, the 1:1 RGB gain may be a value of 1 or an approximate value of 1.

The first color converter 131 may convert the input RGB values (R, G, and B) into first color conversion values (R2', G2', and B2') by multiplying the input RGB values (R, G, and B) by second RGB gains (R2gain, G2gain, and B2gain) in a pixel unit as expressed by following equation (5).

$$R2'=R \times R2\text{gain}$$

$$G2'=G \times G2\text{gain}$$

$$B2'=B \times B2\text{gain} \quad (5)$$

The conversion data setting unit 15 may set second conversion data that will be applied to the input image obtained in the black-and-white mode by using the reference data, that is, color conversion matrix of the black-and-white mode (hereinafter, referred to as 'second color conversion matrix'). Every pixel in the input image may have a different second color conversion matrix Mbw from the others, or may have substantially the same second color conversion matrix Mbw as those of the other pixels in the input image.

In one exemplary embodiment, the second color conversion matrix Mbw may be an identity matrix A. In this case, the second color conversion matrix Mbw may be fixed as the identity matrix A without regard to the illuminance. The identity matrix A may include a matrix expressed by following equation (6) and a matrix that restricts a variation in the first color conversion values (R2', G2', and B2') to the minimum.

$$A = \begin{bmatrix} 1 & 0 & 0 \\ 0 & 1 & 0 \\ 0 & 0 & 1 \end{bmatrix} \quad (6)$$

In another exemplary embodiment, the second color conversion matrix Mbw may be a combination of the first color conversion matrix Mc and the identity matrix A. The second color conversion matrix Mbw may be a weighted sum of the first color conversion matrix Mc to which a weighted value (α) reflecting the illuminance is applied and the identity matrix A, as expressed by following equation (7). By reflecting the illuminance, the color conversion may be performed more accurately. The conversion data setting unit 15 may set the weighted value α in inverse-proportional to the illuminance. Therefore, the weighted value α increases and the weight of the identity matrix A may increase as the illuminance is low. When the weighted value α is 1, the second color conversion matrix Mbw may be the identity matrix A. When the weighted value α is 0, the second color conversion matrix Mbw may be the first color conversion matrix Mc. When the weighted value α ranged from 0 to 1, the second color conversion matrix Mbw may be a combination of the first color conversion matrix Mc and the identity matrix A in a predetermined ratio.

$$Mbw = Mc \times (1-\alpha) + A \times \alpha, \quad 0 \leq \alpha \leq 1 \quad (7)$$

The second color converter 135 may convert the first color conversion values R2', G2', and B2' into second color conversion values R2", G2", and B2" by multiplying the first color conversion values R2', G2', and B2' by the second color conversion matrix Mbw in a pixel unit as expressed by following equation (8).

$$\begin{bmatrix} R2'' \\ G2'' \\ B2'' \end{bmatrix} = Mbw \times \begin{bmatrix} R2' \\ G2' \\ B2' \end{bmatrix} \quad (8)$$

The image converter 15 may convert the color image that is converted by the color converter 13 into a black-and-white image $I_{BW}$ and output the black-and-white image $I_{BW}$.

Figure 7A:
FIGS. 7A to 7D are various examples of black-and-white images generated in a black-and-white mode, with FIG. 7A showing an image generated according to a conventional image generation process and FIGS. 7B-D, showing images generated according a process employing embodiments of the inventive techniques.
Figure 7B:
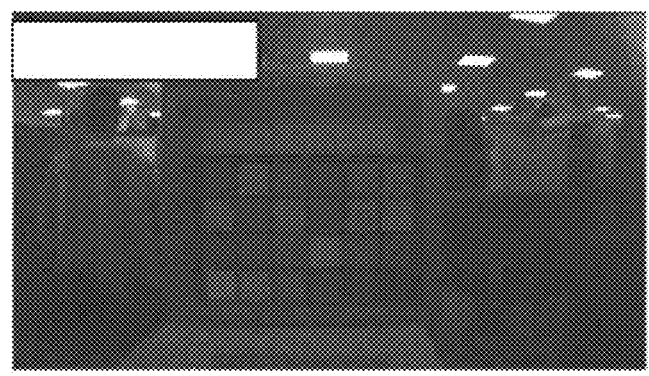
Figure 7C:
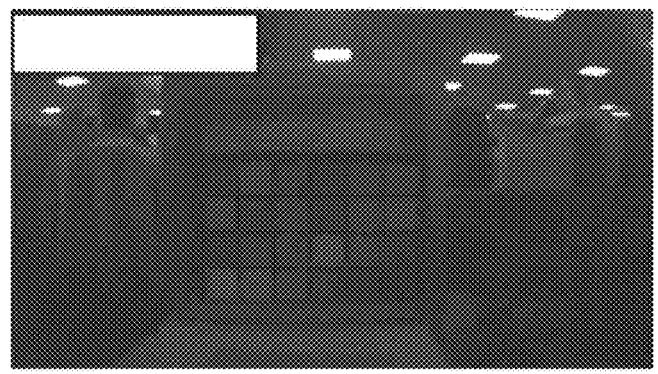
Figure 7D:
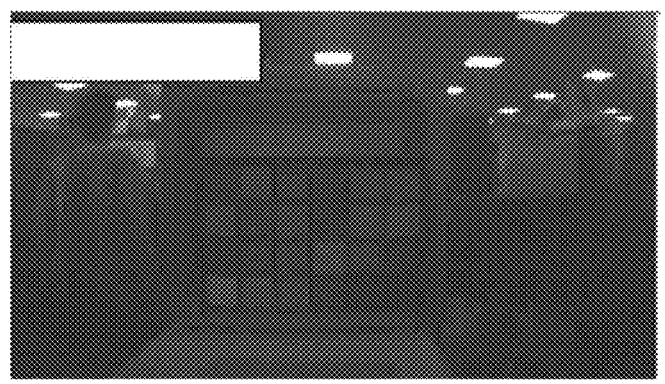

FIGS. 7A to 7D are various examples of black-and-white images generated in a black-and-white mode, with FIG. 7A showing an image generated according to a conventional image generation process and FIGS. 7B-D, showing images generated according a process employing embodiments of the inventive techniques.

FIG. 7A shows a black-and-white image generated by using the first RGB gains and the first color conversion matrix used in the color mode. FIG. 7A shows that black noise occurs in the image. The black noise mainly occurs under a low illuminance condition having a low or high color temperature (2000K or less, or 8000K or greater).

In the low illuminance condition, the ratio of each of the RGB may be differently represented due to noise that the image sensor itself has (the noise occurring due to dark current of the sensor or structural problems of a light receiver) and because the light in the IR band that has been filtered by the IR cut-off filter passes through the IR cut-off filter and is recognized as a sensor input. That is, a certain color component occupying a little importance in the image due to the noise of the image sensor in the low illuminance condition and/or data recognition of the sensor according to the filter type may be amplified due to influence of the RGB gain used to compensate for white balance and color temperature in the color mode and the color conversion matrix or may affect other color components, and thereby black noise occurs.

FIG. 7B shows a black-and-white image generated in a black-and-white mode, in which the second RGB gain is the first RGB gain of the color mode and the second color conversion matrix is the identity matrix, according to an exemplary embodiment of the invention. FIG. 7B eliminates black noise and hence is lighter and the features in the image are less obscured and more defined than those shown in FIG. 7A, thereby making the features in the image of FIG. 7B more recognizable to the human eye than those shown in FIG. 7A.

FIG. 7C shows a black-and-white image generated in a black-and-white mode, in which the second RGB gain is a 1:1 RGB gain and the second color conversion matrix is the first color conversion matrix of the color mode, according to an exemplary embodiment of the invention. FIG. 7C eliminates black noise and hence is lighter and the features in the image are less obscured and more defined than those shown in FIG. 7A, thereby making the features in the image of FIG. 7C more recognizable to the human eye than those shown in FIG. 7A.

FIG. 7D shows a black-and-white image generated in the black-and-white mode, in which the second RGB gain is 1:1 RGB gain and the second color conversion matrix is the identity matrix, according to an exemplary embodiment of the invention. FIG. 7D eliminates black noise and hence is lighter and the features in the image are less obscured and more defined than those shown in FIG. 7A, thereby making the features in the image of FIG. 7D more recognizable to the human eye than those shown in FIG. 7A. The black-and-white image of FIG. 7D is an example, in which the second RGB gain and the second color conversion matrix different from the first RGB gain and the first color conversion matrix used in the color mode are used.

As noted above, when comparing with the black-and-white image of FIG. 7A, black noise is apparently reduced in the black-and-white images shown in each of FIGS. 7B, 7C, and 7D.

In addition, it may be noted that entire brightness of the black-and-white images of FIGS. 7C and 7D is lower than that of the black-and-white image of FIG. 7B. That is, when the second RGB gain is the 1:1 RGB gain, there is a loss of brightness of about 0% to 50%. When taking into account that the black-and-white mode concentrates on recognition or representation of an object in the low illuminance condition, the brightness is an important factor in the black-and-white mode. Thus, as shown in FIG. 7B, the first RGB gain used in the color mode may be used as the second RGB gain and the identity matrix or the matrix that minimizes the color conversion may be used as the second color conversion matrix in the black-and-white mode.

However, at least one of the second RGB gain and the second color conversion matrix of the black-and-white mode may be set differently from the first RGB gain or the first color conversion matrix of the color mode, according to user's selection or usage environment.

Figure 8:
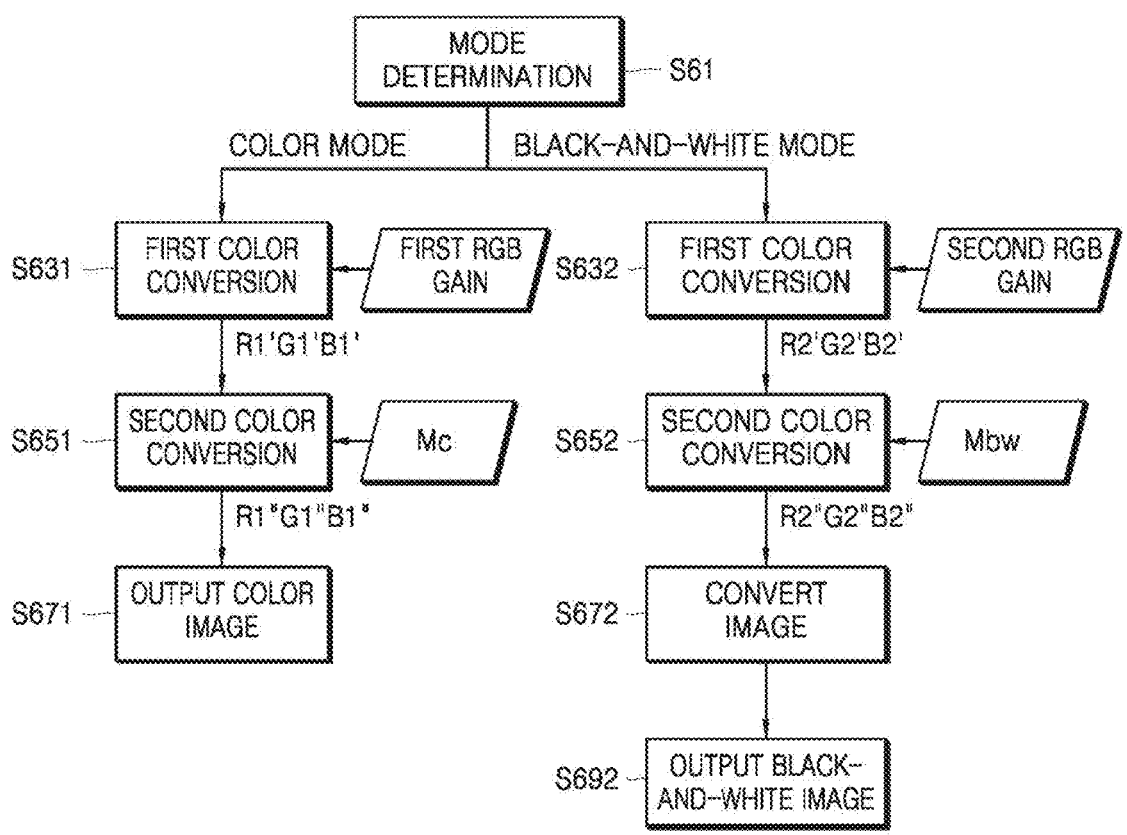
FIG. 8 is a flowchart schematically illustrating an image processing method using a color mode and a black-and-white mode, according to an exemplary embodiment.

FIG. 8 is a flowchart schematically illustrating an image processing method using a color mode and a black-and-white mode, according to an exemplary embodiment. The image processing method illustrated in FIG. 8 may be performed by the processor 10 of FIG. 2. Hereinafter, descriptions of the elements corresponding to those illustrated with reference to FIGS. 2 to 7 will be omitted to avoid redundancy.

Referring to FIG. 8, the mode converter 11 may compare the illuminance with the critical value to determine the image processing mode (S61). The mode converter 11 may determine the image processing mode as the color mode when the illuminance is substantially equal to or greater than the critical value, and as the black-and-white mode when the illuminance is smaller than the critical value.

The processor 10 may perform the signal processes below on the input image obtained in the color mode, if the image processing mode is the color mode.

The first color converter 131 may convert the input RGB value into the first color conversion values R1', G1', and B1' by applying the first RGB gain set by the conversion data setting unit 15 to the input RGB value (S631).

The second color converter 135 may convert the first color conversion values R1', G1', and B1' into the second color conversion values R1", G1", and B1" by applying the first color conversion matrix Mc set by the conversion data setting unit 15 to the first color conversion values R1', G1', and B1' (S651).

The second color converter 135 may output a color image, in which the input RGB value is converted into the second color conversion value R1", G1", and B1" (S671).

The processor 10 may perform following operations on the input image obtained in the black-and-white mode, when the image processing mode is the black-and-white mode.

The first color converter 131 may convert the input RGB value into the first color conversion values R2', G2', and B2' by applying the second RGB gain set by the conversion data setting unit 15 to the input RGB value (S632).

The second color converter 135 may convert the first color conversion values R2', G2', and B2' into the second color conversion values R2", G2", and B2" by applying the second color conversion matrix Mbw set by the conversion data setting unit 15 to the first color conversion values R2', G2', and B2' (S652).

The image converter 17 may convert the color information of the image, in which the input RGB value is converted into the second color conversion values R2", G2", and B2" (S672), and may output a black-and-white image (S692).

Figure 9:
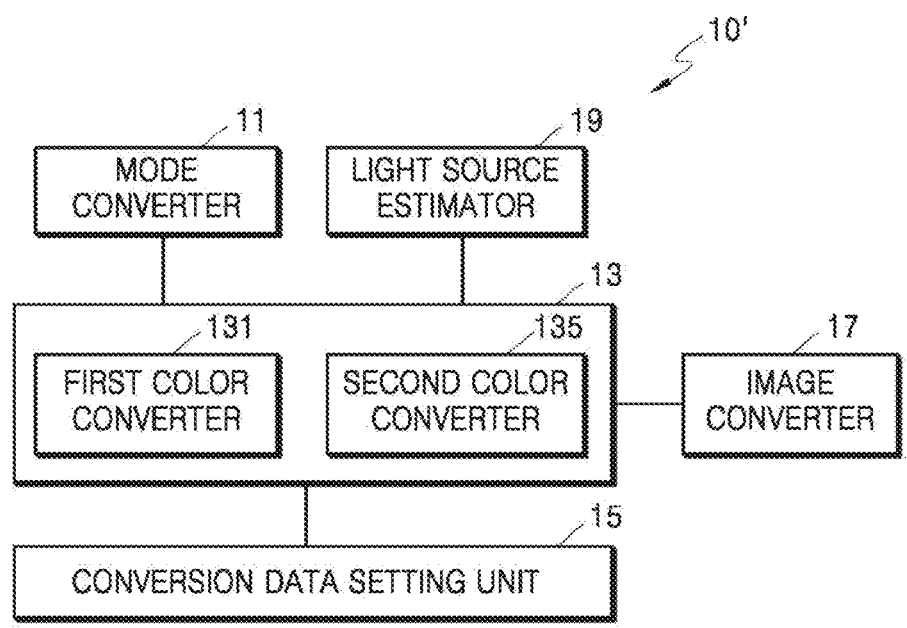
FIG. 9 is a schematic block diagram of another exemplary embodiment of the processor of FIG. 1.
Figure 10:
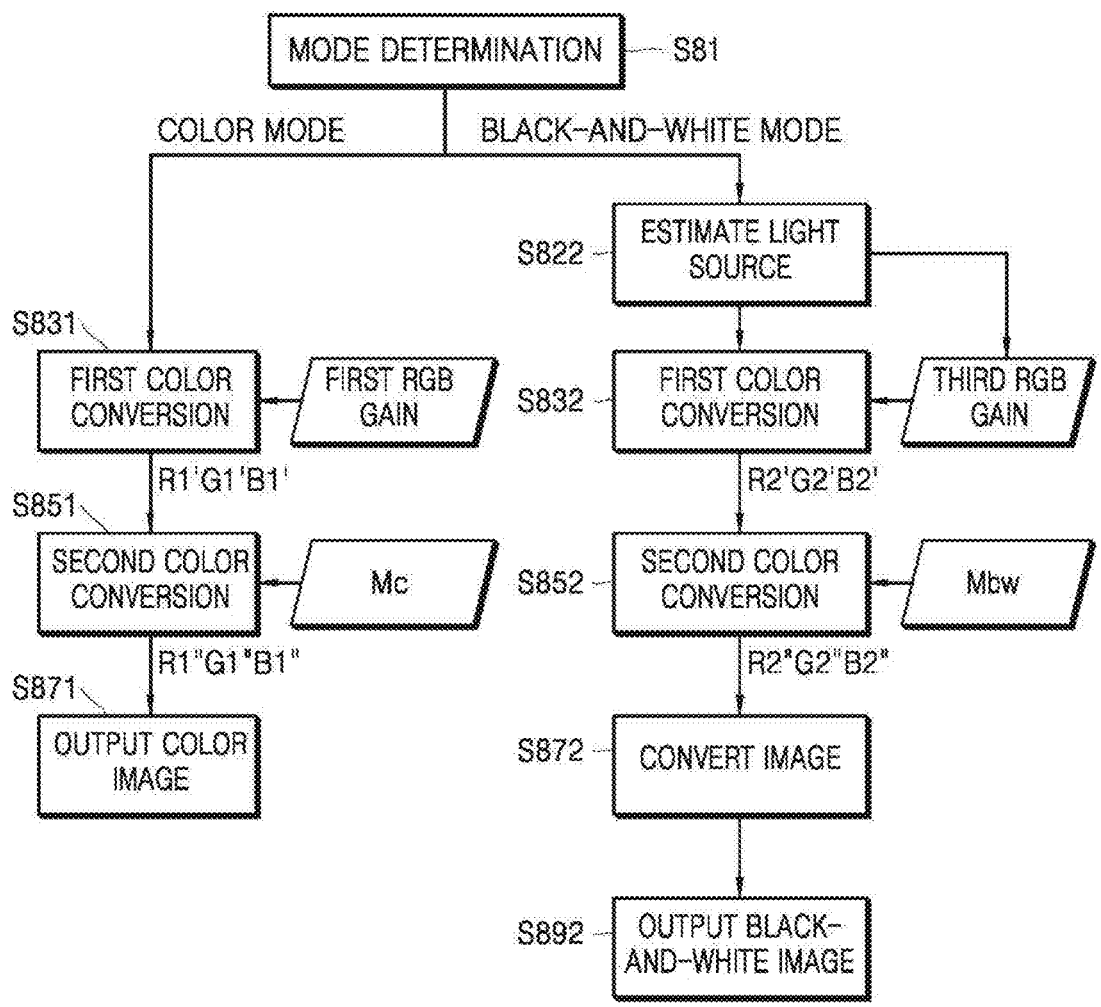
FIG. 10 is a flowchart schematically illustrating an image processing using a color mode and a black-and-white mode performed by the processor of FIG. 9.

FIG. 9 is a schematic block diagram of another exemplary example of the processor 10 of FIG. 1. FIG. 10 is a flowchart schematically illustrating an image processing using a color mode and a black-and-white mode performed by a processor 10' of FIG. 9.

Hereinafter, different operations from those of the processor 10 of FIG. 2 and the processor 10 of FIGS. 5 to 8 will be described below, and detailed descriptions of the corresponding operations will be omitted to avoid redundancy.

Referring to FIG. 9, the processor 10' according to the illustrated embodiment may include a mode converter 11, a color converter 13, a conversion data setting unit 15, an image converter 17, and a light source estimator 19. The color converter 13 may include a first color converter 131 and a second color converter 135.

Referring to FIG. 10 together, the mode converter 11 may determine the image processing mode by comparing the illuminance with the critical value (S81). The mode converter 11 determines the image processing mode as the color mode when the illuminance is substantially equal to or greater than the critical value, and as the black-and-white mode when the illuminance is smaller than the critical value.

The processor 10' may perform following operations on the input image obtained in the color mode, when the image processing mode is the color mode.

The first color converter 131 may convert the input RGB value into the first color conversion values R1', G1', and B1' by applying the first RGB gain set by the conversion data setting unit 15 to the input RGB value (S831).

The second color converter 135 may convert the first color conversion values R1', G1', and B1' into the second color conversion values R1", G1", and B1" by applying the first color conversion matrix Mc set by the conversion data setting unit 15 to the first color conversion values R1', G1', and B1' (S851).

The second color converter 135 may output a color image, in which the input RGB value is converted into the second color conversion value R1", G1", and B1" (S871).

The processor 10' may perform following operations on the input image obtained in the black-and-white mode, when the image processing mode is the black-and-white mode.

The light source estimator 19 may estimate the light source based on the RGB value of the input image by using the reference data (S822). The light source may include natural light, fluorescent light, incandescent light, etc. The light source estimation method is not particularly limiting, and various well-known methods may be used.

The first color converter 131 may convert the input RGB value into the first color conversion values R2', G2', and B2' by applying a third RGB gain that is set by the conversion data setting unit 15 based on the estimated light source to the input RGB value (S832).

The conversion data setting unit 15 may set first conversion data, that is, the third RGB gain that will be applied to the input image obtained in the black-and-white mode by using the reference data. The third RGB gain may be obtained by adjusting the second RGB gain by reflecting the light source information. Every pixel in the input image may have a third RGB gain different from the others, or may have a third RGB gain substantially equal to those of the other pixels in the input image.

The third RGB gain may be a weighted sum of the first RGB gain and the second RGB gain to which a weighted value β reflecting the light source information, as expressed by following equation (9), has been included. The first RGB gain is used in the color mode. The second RGB gain is used in the black-and-white mode. That is, the second RGB gain may be the first RGB gain in one embodiment or may be a 1:1 RGB gain in another embodiment. By reflecting the light source information, the color conversion may be performed more accurately. The conversion data setting unit 15 may set the weighted value β according to the light source. The conversion data setting unit 15 may set the weighted value β to be greater as the light source is closer to natural light.

$$\text{third } RGB \text{ gain} = \text{first } RGB \text{ gain} \times (1-\beta) + \text{second } RGB \text{ gain} \times \beta$$

$$0 \leq \beta \leq 1 \tag{9}$$

The second color converter 135 may convert the first color conversion values R2', G2', and B2' into the second color conversion values R2", G2", and B2" by applying the second color conversion matrix Mbw set by the conversion data setting unit 15 to the first color conversion values R2', G2', and B2' (S852). The second color conversion matrix Mbw may be the identity matrix A or a weighted sum of the first color conversion matrix Mc and the identity matrix A as expressed by equation (7).

The image converter 17 may convert the color information of the image, in which the input RGB value is converted into the second color conversion values R2", G2", and B2", into brightness information (S872), and may output a black-and-white image (S892).

The above embodiments describe image processing for converting an image obtained by using a dummy glass under a low illuminance condition into a black-and-white image, but the embodiments of the invention are not limited thereto. Thus, image processing may be applied to all cases in which a color image obtained in a low illuminance condition is converted into a black-and-white image. For example, one or more exemplary embodiments may be applied to the case in which an image obtained by using a low band pass filter in a low illuminance condition is converted into a black-and-white image by adjusting a second RGB gain and a second color conversion matrix.

In the above-described exemplary embodiments, the illuminance is sensed by the illuminance sensor, but the embodiments are not limited thereto. That is, the illuminance may be estimated based on a global brightness value such as an average brightness value of entire pixels in the input image.

The image processing method according to the exemplary embodiments may be implemented as computer-readable codes in a computer-readable recording medium. The computer readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the exemplary embodiment may be easily construed by programmers skilled in the art to which the disclosure pertains.

The image processing device and methods according to the principles and exemplary embodiments of the invention may use different color conversion data of the image obtained in the color mode from the color conversion data of the image obtained in the black-and-white mode under a low illuminance condition, and thus, black noise that occurs in a black-and-white image according to the prior art may be reduced so that visibility and recognition of an image acquired in a low illuminance condition may be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An image processing device comprising:
   an image obtaining unit configured to obtain a first image under a condition where an illuminance is substantially equal to or greater than a critical value, and to obtain a second image under a condition where the illuminance is less than the critical value;
   a mode converter configured to convert an image processing mode into a first mode, in which color signal processing is performed on the first image, and a second mode, in which black-and-white signal processing is performed on the second image;
   a color converter configured to convert a color of the first image by applying first color conversion data, including first conversion data and second conversion data, to the first image, and to convert a color of the second image by applying second color conversion data, including first conversion data and second conversion data, that is different from the first color conversion data to the second image; and
   an image converter configured to convert the color converted second image into a third image, in which color information of the second image is converted into brightness information,
   wherein the first conversion data is gain and the second conversion data is a color conversion matrix, and the gain of the second color conversion data is substantially equal to the gain of the first color conversion data.

2. The image processing device of claim 1, wherein at least one of the first conversion data and the second conversion data of the second color conversion data is different from the other of the first conversion data and the second conversion data of the first color conversion data.

3. The image processing device of claim 1, wherein the color conversion matrix of the second color conversion data is an identity matrix.

4. The image processing device of claim 1, wherein the color conversion matrix of the second color conversion data is a combination of a color conversion matrix of the first color conversion data and an identity matrix.

5. The image processing device of claim 4, wherein, in the color conversion matrix of the second color conversion data, a ratio of the identity matrix increases as the illuminance becomes lower than a critical value.

6. The image processing device of claim 1, wherein the first image comprises visible ray band information, and the second image comprises the visible ray band and infrared ray (IR) band information.

7. A method of processing images comprising the steps of:
   selecting an image processing mode from a first mode, in which color signal processing is performed on a first image obtained under a condition where illuminance is substantially equal to or greater than a critical value, and a second mode, in which black-and-white signal processing is performed on a second image obtained under a condition where the illuminance is less than the critical value;
   if the first mode is selected, converting a color of the first image by applying first color conversion data including first conversion data and second conversion data to the first image;
   if the second mode is selected, converting a color of the second image by applying second color conversion data, including first conversion data and second conversion data, that is different from the first color conversion data to the second image, the first conversion data comprising a gain and the second conversion data comprising a color conversion matrix, and the gain of the second color conversion data being substantially equal to the gain of the first color conversion data; and
   converting the color converted second image into a third image, including converting the color information of the second image into brightness information.

8. The method of claim 7, wherein at least one of the first conversion data and the second conversion data of the second color conversion data is different from the other of the first conversion data and the second conversion data of the first color conversion data.

9. The method of claim 7, wherein the color conversion matrix of the second color conversion data is an identity matrix.

10. The method of claim 7, wherein the color conversion matrix of the second color conversion data is a combination of a color conversion matrix of the first color conversion data and an identity matrix.

11. The method of claim 10, wherein in the color conversion matrix of the second color conversion data, a ratio of the identity matrix increases as the illuminance becomes lower than the critical value.

12. The method of claim 7, wherein the first image comprises visible ray band information, and the second image comprises the visible ray band information and infrared ray (IR) band information.

13. An image processing device comprising:
   an image obtaining unit configured to obtain a first image under a condition where an illuminance is substantially equal to or greater than a critical value, and to obtain a second image under a condition where the illuminance is less than the critical value;
   a mode converter configured to convert an image processing mode into a first mode, in which color signal processing is performed on the first image, and a second mode, in which black-and-white signal processing is performed on the second image;

a color converter configured to convert a color of the first image by applying first color conversion data including first conversion data and second conversion data to the first image, and to convert a color of the second image by applying second color conversion data, including first conversion data and second conversion data, that is different from the first color conversion data to the second image; and an image converter configured to convert the color converted second image into a third image, in which color information of the second image is converted into brightness information, wherein the first conversion data is a gain and the second conversion data is a color conversion matrix, and wherein the gain of the second color conversion data is adjusted based on a light source information and the adjusted gain is a combination of the gain of the first color conversion data and the gain of the second color conversion data, and the color conversion matrix of the second color conversion data is an identity matrix or a combination of the color conversion matrix of the first color conversion data and an identity matrix.

14. A method of processing images comprising the steps of:

selecting an image processing mode from a first mode, in which color signal processing is performed on a first image obtained under a condition where illuminance is substantially equal to or greater than a critical value, and a second mode, in which black-and-white signal processing is performed on a second image obtained under a condition where the illuminance is less than the critical value;

if the first mode is selected, converting a color of the first image by applying first color conversion data including first conversion data and second conversion data to the first image;

if the second mode is selected, converting a color of the second image by applying second color conversion data, including first conversion data and second conversion data, that is different from the first color conversion data to the second image, the first conversion data comprising a gain and the second conversion data comprising a color conversion matrix, the gain of the second color conversion data being adjusted based on a light source information and the adjusted gain being a combination of the gain of the first color conversion data and the gain of the second color conversion data, and the color conversion matrix of the second color conversion data being an identity matrix or a combination of the color conversion matrix of the first color conversion data and an identity matrix; and converting the color converted second image into a third image, including converting the color information of the second image into brightness information.

* * * * *